United States Patent [19]
Kelley

[11] Patent Number: 5,628,281
[45] Date of Patent: May 13, 1997

[54] AQUARIUM FILTERING AND HEATING SYSTEM

[76] Inventor: Scott A. Kelley, P.O. Box 420446, Houston, Tex. 77242-0446

[21] Appl. No.: 378,628

[22] Filed: Jan. 26, 1995

Related U.S. Application Data

[63] Continuation-in-part of Ser. No. 225,645, Apr. 11, 1994, abandoned.

[51] Int. Cl.⁶ .......................... A01K 63/04; A01K 63/06
[52] U.S. Cl. ...................... 119/262; 119/267; 119/261
[58] Field of Search .................... 119/253, 257, 119/265, 266, 259, 261, 262, 267, 269; D30/101, 106, 107, 104

[56] References Cited

U.S. PATENT DOCUMENTS

| | | | |
|---|---|---|---|
| 31,040 | 1/1861 | Shlarbaum | 119/257 |
| 3,018,758 | 1/1962 | Arnould | 119/265 |
| 3,821,514 | 6/1974 | Lambo | 119/259 |
| 3,983,843 | 10/1976 | Johnson | 119/259 |
| 4,151,810 | 5/1979 | Wiggins | 119/262 |
| 5,026,477 | 6/1991 | Yen | 119/261 |
| 5,062,950 | 11/1991 | Shieh | 119/259 |
| 5,474,673 | 12/1995 | Ludlow | 119/262 |

FOREIGN PATENT DOCUMENTS

| | | | |
|---|---|---|---|
| 616768 | 9/1994 | European Pat. Off. | 119/259 |
| 2811412 | 9/1979 | Germany | 119/253 |
| 406121630 | 5/1994 | Japan | 119/269 |
| 2262893 | 7/1993 | United Kingdom | 119/259 |

*Primary Examiner*—Todd E. Manahan
*Attorney, Agent, or Firm*—Mark A. Tidwell; Robert C. Curfiss; Butler & Binion, L.L.P.

[57] ABSTRACT

An energy efficient aquarium system with a separate cover wherein the lamp or lamps are located below the filters and filter ponds thus heating the filter pond bottom and sides to further heat the water contained in the filter ponds thus eliminating the need for a separate heater and further saving the energy required to heat the water as it flows into the aquarium. Floats each with a filter condition indicator bar are located in the filter ponds wherein the filter condition indicator bars extend through the cover and further indicate the condition of the filter as the water rises in the filter ponds due to the filters filling up with debris that restricts the flow of water passing through the filter; as the water rises in the filter ponds, the float rises and further causes the filter condition indicator to rise wherein it may easily be seen. When the filter condition indicator rises to a predetermined height, the owner of the aquarium would be given notice that the filters need to be changed.

8 Claims, 6 Drawing Sheets

AQUARIUM FILTERING AND HEATING SYSTEM

Cross reference to related applications continuation-in-part to U.S. patent application Ser. No. 08/225,645 filed on Apr. 11th, 1994 now abandoned.

BACKGROUND OF INVENTION

There are many aquariums available with heaters, lamps, filter systems, pumps and aerators however none of these aquariums have a single means of both heating the water and lighting the aquarium at the same time with only one lamp. All aquariums use both a lamp for light and a heater for heat wherein any heat given off by the lamp escapes the aquarium. Although all or most aquariums use filters, none of the aquariums have any means to determine if the filter requires a change or cleaning after the filter has been in use for a period of time.

Several aquariums have lamps or heaters such as Groth U.S. Pat. No. 3,721,212 and M. M. Arnold U.S. Pat. No. 3,018,758. However, none of these aquariums patents or designs teach a lamp below a filter pond or a condition indicator.

SUMMERY OF THE INVENTION

It is the object of an present invention to provide a filter system wherein the condition of the filter is indicated or shown by merely looking at the top of the aquarium covers.

It is also the object of an present invention to provide an energy savings means to efficiently collect all or most of the heat produced by the lamps wherein the heat is used to heat water in the aquarium.

It is yet another object of the present invention to provide a more efficient means of aerating the water as it passes through the filters, filter ponds and filter steps.

It is still another object of the present invention to to provide a clear tank with an uncluttered view of any objects contained in the tank wherein the tank is also aesthetically pleasing and space saving.

It is also another object of the present invention to provide an aquarium wherein the filter may be easily accessed and changed.

The foregoing and other objects and advantages of the invention are attained by a more efficient filtering system wherein the filters are placed in a vertical position and the water passes through the unclogged upper section of the filter until that section of the filter is clogged and the water rises. As the water rises, the float rises and further causes the filter condition indicator bar to rise thus indicating the amount of the filter that is clogged with debris from the aquarium.

In accordance with another feature of the invention, the lamp is used for two purposes; the first purpose of the lamp is to provide light or to illuminate the aquarium and the items within the aquarium; the second purpose of the lamp is to provide an efficient source of heat for the water as it passes through the filters, filter ponds and aerator steps.

The features of the present invention can best be understood together with further objects and advantages by referring to the following descriptions in connection with the accompanying drawings wherein like numerals indicate like parts.

DETAILED DESCRIPTION OF THE PREFERRED EMBODIMENT

Figure 1:
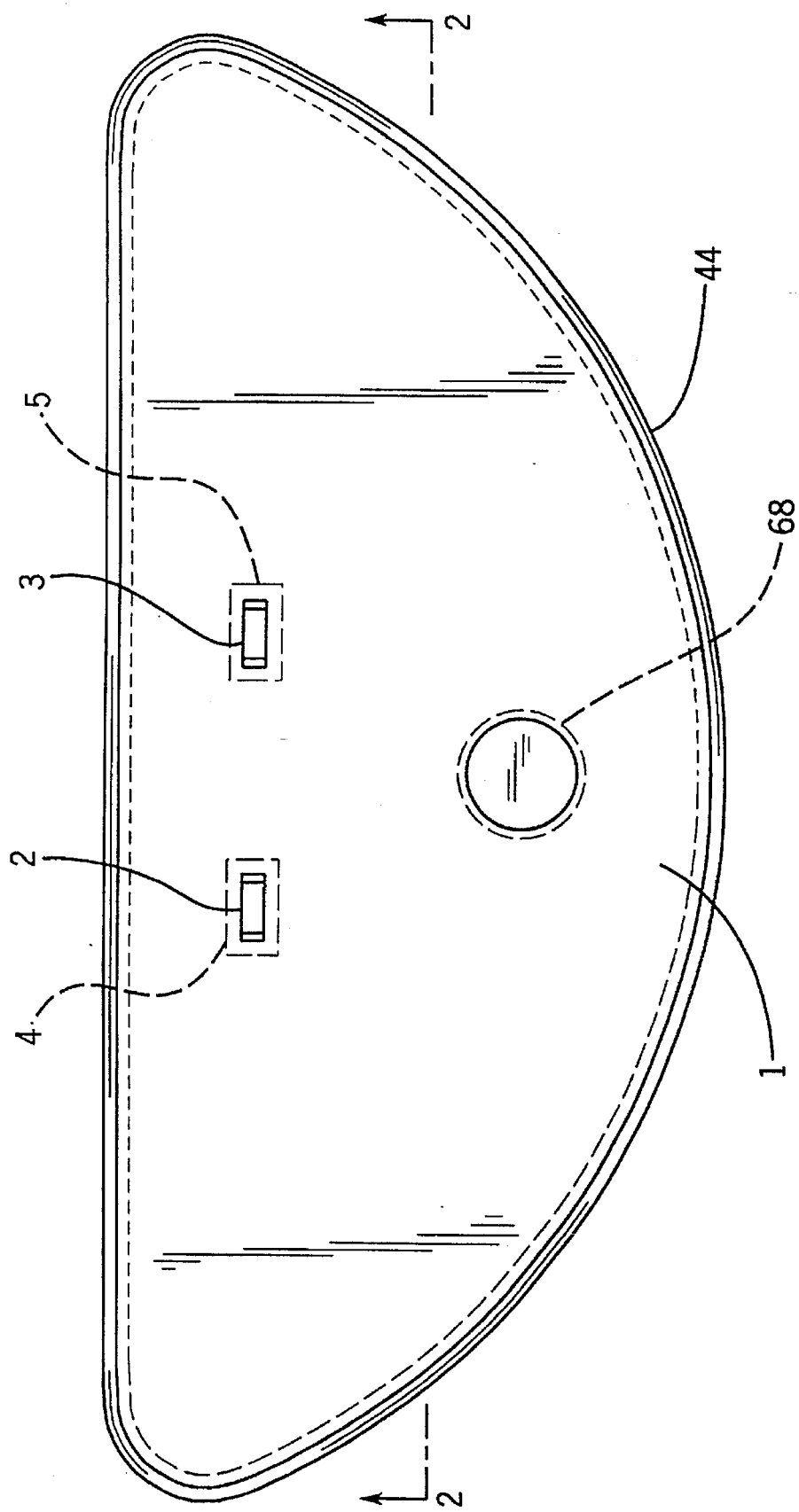
FIG. 1 is a plan view of the top cover of the aquarium.

Referring to FIG. 1 there is shown a plan view of the aquarium cover 1 of the preferred embodiment.

The aquarium cover 1 has a first filter condition indicator 2 and a second filter condition indicator 3. The first filter condition indicator 2 is shown extending through the first indicator guide 4 formed in the aquarium cover 1. The second filter condition indicator 3 is shown extending through the second indicator guide 5 formed in the aquarium cover 1. A feeder tube 68 is shown wherein fish or other items in the aquarium may be fed without removing the aquarium cover.

Figure 2:
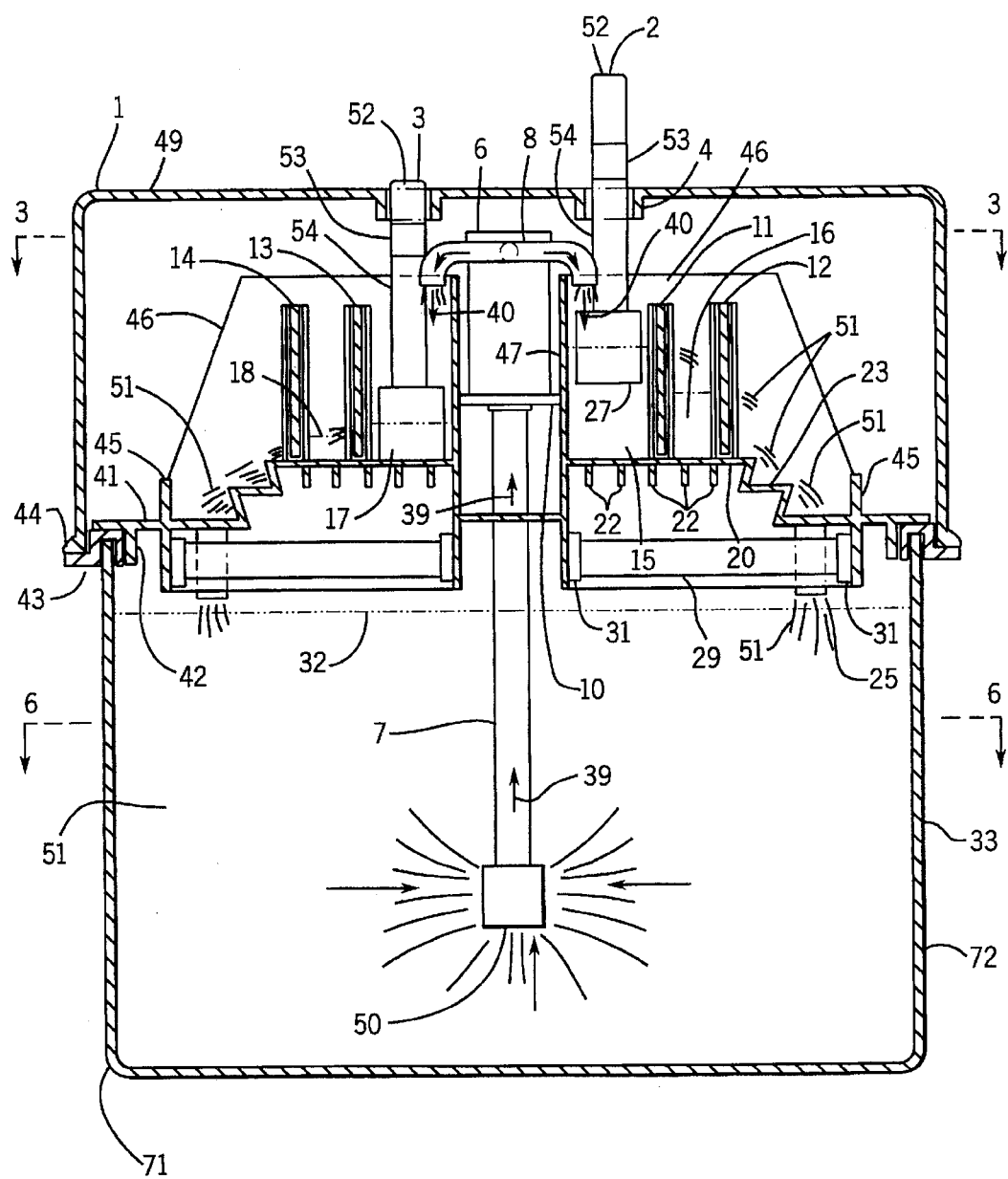
FIG. 2 is a section elevation of the aquarium as taken through FIG. 1.

The outer perimeter of the aquarium cover 1 is defined by the cover lip 44 which will be more clearly shown in FIG 2.

Referring to FIG. 2 there is shown a section elevation of the aquarium 33, the aquarium cover I and the filter tray 41. The aquarium 33 is essentially a three layer system comprised of the aquarium cover 1, the aquarium filter tray 41 and the aquarium tank 72. The aquarium cover 1 is the third layer.

The filter tray 41 which is the second layer, is shown supported on the cover and filter tray support rim 43 which is shown formed on the lip of aquarium tank 72. The cover and filter tray support rim 43 is also shown supporting the aquarium cover 1 at the cover lip 44. The cover lip 44 adds strength and allows the aquarium cover 1 to hold its shape at the lower end of the aquarium cover 1. The cover top 49 allows the aquarium cover 1 to hold its shape at the upper end of the aquarium tank.

The aquarium cover 1 is shown made out of one piece of thermoformed or injection molded plastic or other suitable material such as glass or metal. The aquarium cover 1 may be transparent or opaque by design choice.

The cover and filter tray support rim 43 extends around the entire perimeter of the lip of aquarium tank 72 and could be almost any configuration by design choice and is further made out of any suitable material such as plastic, rubber, metal or glass also by design choice.

The aquarium filter tray 41 is shown with a filter tray flange 42 which extends around most of the aquarium filter tray 41 and prevents the filter tray from moving horizontally on on the cover and filter tray support rim 43.

The pump 6 is shown supported on the pump support flange 10. The pump filter 50 is shown suitably and removable fixed to the intake pump tube 7. The pump filter 50 prevents fish, plants, and other objects in the aquarium 33 from being drawn into the pump 6. The pump 6 draws the liquid 51 contained within aquarium tank 72. Liquid 51 contains debris suspended therein. Liquid 51 is drawn in an upward direction 39 through the pump filter 50 that is shown fixed to the lower end of the intake tube 7. The liquid 51 flows into the pump 6 where it is discharged through the first discharge tube 8 into first and second filter systems 58 and 59 which are symmetrically located about pump 6.

Turning first to first filter system 58, the liquid 51 flows through discharge tube 8 in a downward direction 40 into the the first filter pond 15, from the first filter pond 15 through the first filter 11 where the debris is stopped and collected in the first filter 11 and into the second filter pond 16 wherein the the liquid 51 further flows through the second filter 12 and where even more debris or smaller particles of debris are caught in the second filter 12, and further flows over the first set of aerator steps 23 wherein air is allowed to mix with the liquid 51 and after the liquid 51 flows over the first aerator steps 23, the liquid 51 further flows through the first outflow tubes 25 and into the aquarium 33 to mix with the liquid 51 in the aquarium tank 72 wherein the liquid 51 is shown at the aquarium liquid level 32.

The first outflow tubes 25 have a first end and a second end, wherein the liquid 51 enters the first end and flows out the second end to prevent liquid 51 from flowing over the first lamp 29.

As the liquid 51 flows from the first filter pond 15 and through the first filter 11, various debris such as marine life feces, sediment, algae and the like are caught in the first filter 11. As this debris is caught up in the first filter 11 it will clog the first filter 11 at the elevation that the liquid flows through the first filter 11. As the liquid 51 flows through the first filter 11 and the debris clogs the first filter 11 where the liquid 51 flows, the water elevation in the first pond 15 will rise as the lower section of the first filter 11 is essentially clogged up with debris and is essentially acting as a dam. As the liquid level in the first filter pond 15 rises, it will cause the first float 27 to rise and move in an upward direction 39 and further pushing up on the first filter condition indicator 2. The first end of the first filter condition indicator 2 is suitably fixed to the first float 27 and extends upward wherein the second end of the first filter condition indicator 2 extends near or through the first indicator guide 4 in the aquarium cover 1.

The first section 52 of the second end of the first filter condition indicator 2 would be colored green or have a suitable symbol on it to indicate that the first filter 11 still had unused or unclogged filter area; the second section 53 of the second end of the first filter condition indicator 2 would be colored yellow or a suitable symbol would be formed on the second section to indicate that the first filter 11 would be somewhat used up but still functional. The third section 54 of the first filter condition indicator 2 would be colored red or have a suitable symbol to indicate that the first filter 11 is used up or almost all filled up and should be cleaned or replaced with another suitable filter.

As the liquid 51 fills the first filter pond 15 it is contained between the first containment bulkhead 46 the second side containment bulkhead 55 (FIG. 3), the upper containment bulkhead 47, and the filter bottom 20. After the liquid 51 flows over the first set of aerator steps 23 the liquid 51 is further contained by the lower containment bulkhead 45 until it flows through the first outflow tubes 25.

As the liquid 51 is contained in the first filter pond 15 and second filter pond 16 and the first set of aerator steps 23, the filter bottom 20, made out of plastic, glass, metal or other suitable material, is constantly being warmed by the heat as it rises from the first lamp 29. The heat is caught and collected on the heat vanes 22 and the filter bottom 20 wherein the heat is then collected off the filter bottom 20 and the first set of aeration steps 23 thus suitably warming the liquid 51 and further eliminating the need of a heater to heat the liquid 51 in the aquarium 33 and further saving energy by both efficiently heating the liquid 51 and lighting the aquarium 33 with only one source.

The first lamp 29 is shown held in place and supported by two lamp sockets 31. The first lamp 29 could also be held in place by only one socket by design choice. The first lamp most likely would be electric however it could be energized by gas, kerosene or other suitable means.

With respect to the second filter system 59, the liquid 51 flows through discharge tube 8 in a downward direction 40 into the the third filter pond 17, from the third filter pond 17 through the third filter 13 and into the fourth filter pond 18 wherein the the liquid 51 further flows through the fourth filter 14 and over the second set of aerator steps 24 wherein air is allowed to mix with the liquid 51 and after the liquid 51 flows over the second aerator steps 24, the liquid 51 flows through the second outflow tubes 26 and into the aquarium 33 to mix with the liquid 51 in the aquarium 33 wherein the liquid 51 is shown at the aquarium liquid level 32.

The second outflow tubes 26 have a first end and a second end, wherein the liquid 51 enters the first end and flows out the second end to prevent liquid 51 from flowing over the second lamp 30.

As the liquid 51 flows from the third filter pond 17 and through the third filter 13 various debris such as marine life feces, sediment, algae and the like are caught in the third filter 13. As this debris is caught up in the third filter 13 it will clog the third filter 13. As the liquid 51 flows through the third filter 13 and the debris clogs the third filter 13 where the liquid 51 flows, the water elevation in the third filter pond 17 will rise as the lower section of the third filter 13 is clogged up with debris and is acting as a dam. As the liquid level in the third filter pond 17 rises, it will cause the second float 28 to rise and move in an upward direction 39 and further pushing up on the second filter condition indicator 3. The first end of the second filter condition indicator 3 is suitably fixed to the second float 28 and extends upward wherein the second end of the second filter condition indicator 3 extends near or through the second indicator guide 5 in the aquarium cover 1.

The first section 52 of the second end of the second filter condition indicator 3 would be colored green or have a suitable symbol on it to indicate that the third filter 13 still had unused filter area; the second section 53 of the second end of the second filter condition indicator 3 would be colored yellow or a suitable symbol would be formed on the second section to indicate that the second filter 13 would somewhat used up but still functional. The third section 54 of the second filter condition indicator 3 would be colored red or have a suitable symbol to indicate that the third filter 13 is used up or almost all filled up and should be cleaned or replaced with another suitable filter.

As the liquid 51 fills the third filter pond 17 it is contained between the first containment bulkhead 46 the second side containment bulkhead 55 (FIG. 3), the upper containment bulkhead 47, and the filter bottom 20. After the liquid 51 flows over the second set of aerator steps 24 the liquid 51 is further contained by the lower containment bulkhead 45 until it flows through the second outflow tubes 26.

As the liquid 51 is contained in the third filter pond 17 and fourth filter pond 18 and the second set of aerator steps 24, the filter bottom 20, made out of plastic, glass, metal or other suitable material, is constantly being warmed by the heat generated or produced by the second filter lamp 30, as it rises from the second lamp 30. The heat is caught and collected on the heat vanes 22 and the filter bottom wherein the heat is then collected off the filter bottom 20 and the second set of aeration steps 24 thus suitably warming the liquid 51 and further eliminating the need of a heater to heat the liquid 51 in the aquarium 33 and further saving energy by both efficiently heating the liquid 51 and lighting the aquarium 33 with only one source.

The second lamp 30 is shown held in place and supported by two lamp sockets 31. The second lamp 30 could also be held in place by only one socket by design choice. The second lamp most likely would be electric however it could be energized by gas, kerosene or other suitable means.

The first lamp 29 and the second lamp 30 are shown above the aquarium liquid level 32 however additional lamps could be placed below the aquarium liquid level.

The lower containment bulkhead 45, the first side containment bulkhead 46, and the second side containment bulkhead 55 (FIG. 3) all have a first end, a second end, an upper end and a lower end for the first filter system 58 and the second filter system 59.

The first filter 11, the second filter 12, the third filter 13 and the fourth filter 14 are held in place by a filter support frame 19. The filter support frame 19 allows the filters to be inserted vertically from above while still maintaining a fluid tight fit between the filter and the filter support frame 19 which will force the liquid 51 to flow through the filters and not around the edges of the filters.

Figure 3:
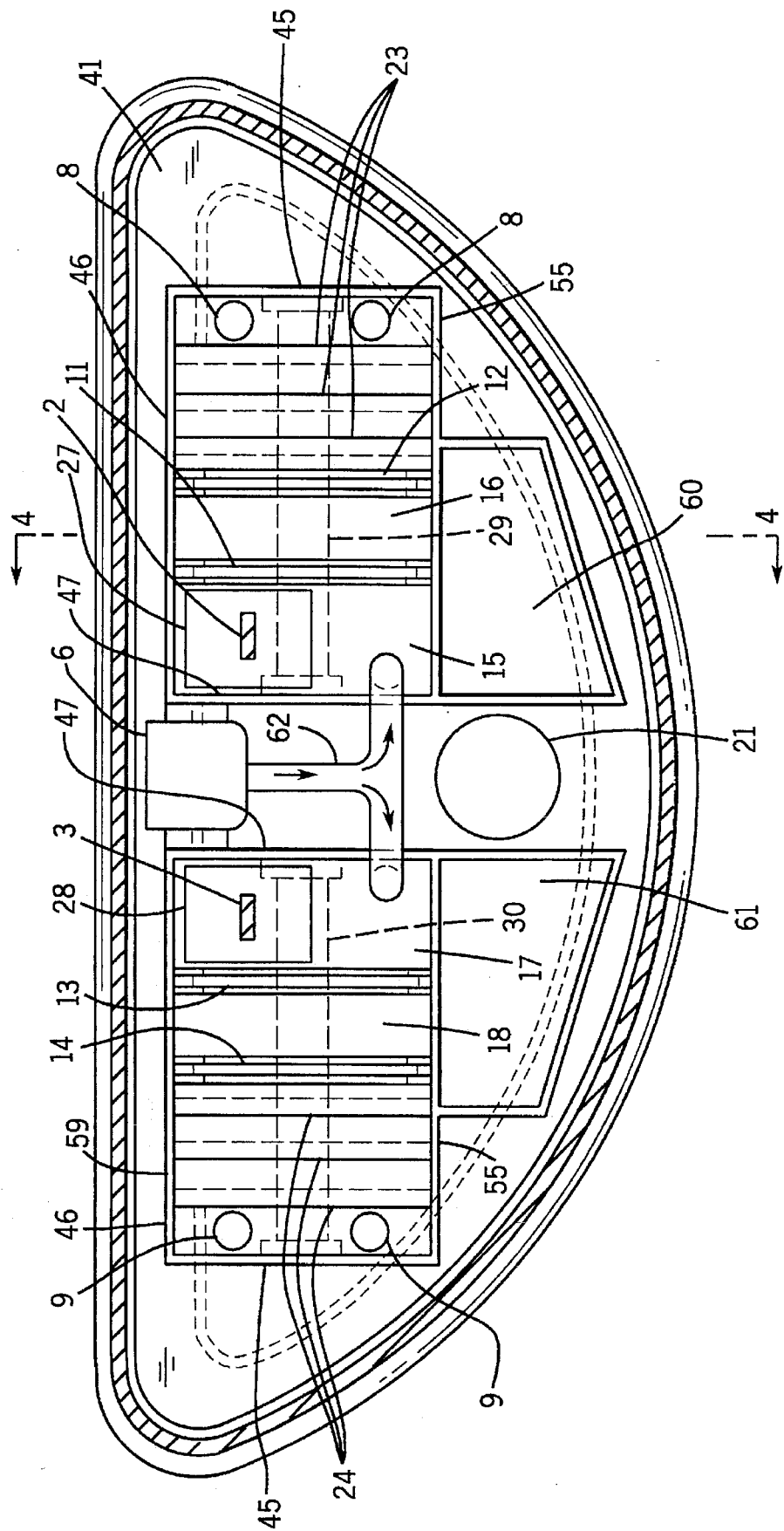
FIG. 3 is a section plan view of the aquarium, cover and filter tray as taken through FIG. 2.

Referring to FIG. 3 there is shown a section plan view of the aquarium filter tray 41 as taken through FIG. 2. The first filter system 58 and the second filter system 59 are shown supported on the aquarium filter tray 41. An access hole 21 shown formed in the aquarium filter tray 41 is located near the center of the filter tray 41 to allow the marine life or other items to be fed or medicated or liquid 51 to be treated, without removing the aquarium filter tray 41.

The first float 27 and the second float 28 are shown in the first filter pond 15 and the third filter pond 17, respectively. The first filter condition indicator 2 and the second filter indicator 3 are shown suitably fixed to the first float 27 and the second float 28, respectively.

The first filter pond 15 and the second filter pond 16 and the first set of aerator steps 23 are shown divided by the first filter 11 and the second filter 12. The third filter pond 17, the fourth filter pond 18 and the second set of aerator steps 24 are also shown divided by the third filter 13 and the fourth filter 14. Shown near the first set of aerator steps 23 are the first discharge tubes 8 and also shown near the second set of aerator steps 24 are the second discharge tubes 9. The lower containment bulkhead 45, the first side containment bulkhead 46, the second side containment bulkhead 55 and the upper containment bulkhead 47 are shown on the first filter system 58 and the second filter system 59.

The first lamp 29 and the second lamp 30 are shown with hidden lines below the first filter system 58 and the second filter system 59. The main discharge tube 62 is shown suitably fixed to the pump 6. The first supply compartment 60 and the second supply compartment 61 provides space to store food, treatments, spare filters and the like.

Figure 4:
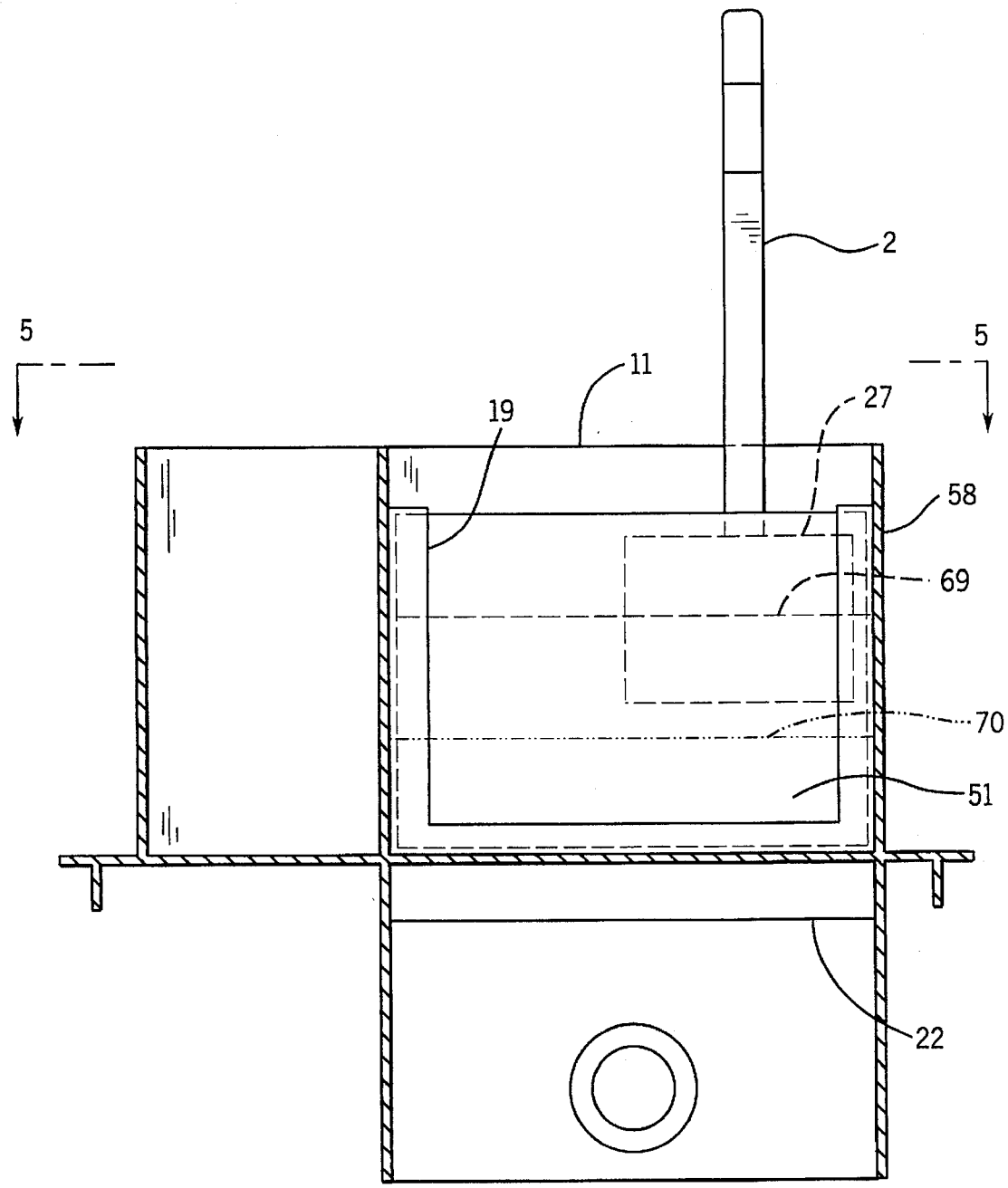
FIG. 4 is a section elevation view as taken through FIG. 3.

Referring to FIG. 4 there is shown a section elevation view of the first filter system 58 as taken through FIG. 3.

The water elevation in the first pond 69 is shown with hidden lines. The water elevation in the second pond 70 is shown below the water elevation in the first pond as is shown in FIG. 2. The first float 27 is shown with hidden lines floating in the first pond. The first filter condition indicator 2 is shown suitably fixed to the upper end of the first float 27. The filter support frame 19 is shown supporting and holding the first filter in place.

Below the first filter system 58 is one of the heat vanes 22 and below the heat vane 22 is the lamp 29 and a lamp socket 31. The heat from the first lamp 29 is absorbed by the heat vane 22 and the filter bottom 20 of the first filter system 58 and is further transferred into the liquid 51 wherein all of the liquid 51 in the aquarium 33 is eventually heated.

Figure 5:
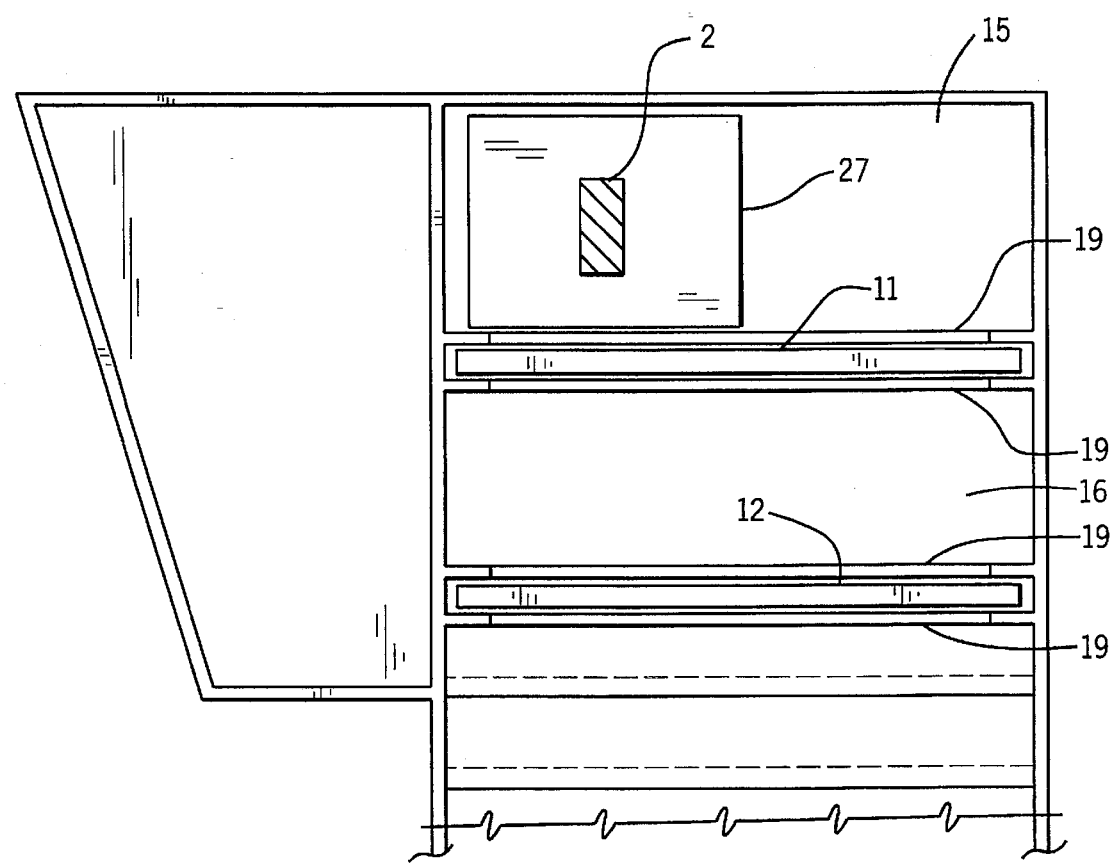
FIG. 5 is an enlarged section plan view as taken through FIG. 4.

Referring to FIG. 5 there is shown an enlarged section plan view of the first filter system as taken through FIG. 4.

The first filter 11 and the second filter 12 are shown suitably held in place in the filter support frame 19. The first float 27 and the first filter condition indicator 2 are shown in the first filter pond 15. The second filter pond 16 is shown between the first filter 11 and the second filter 12.

Figure 6:
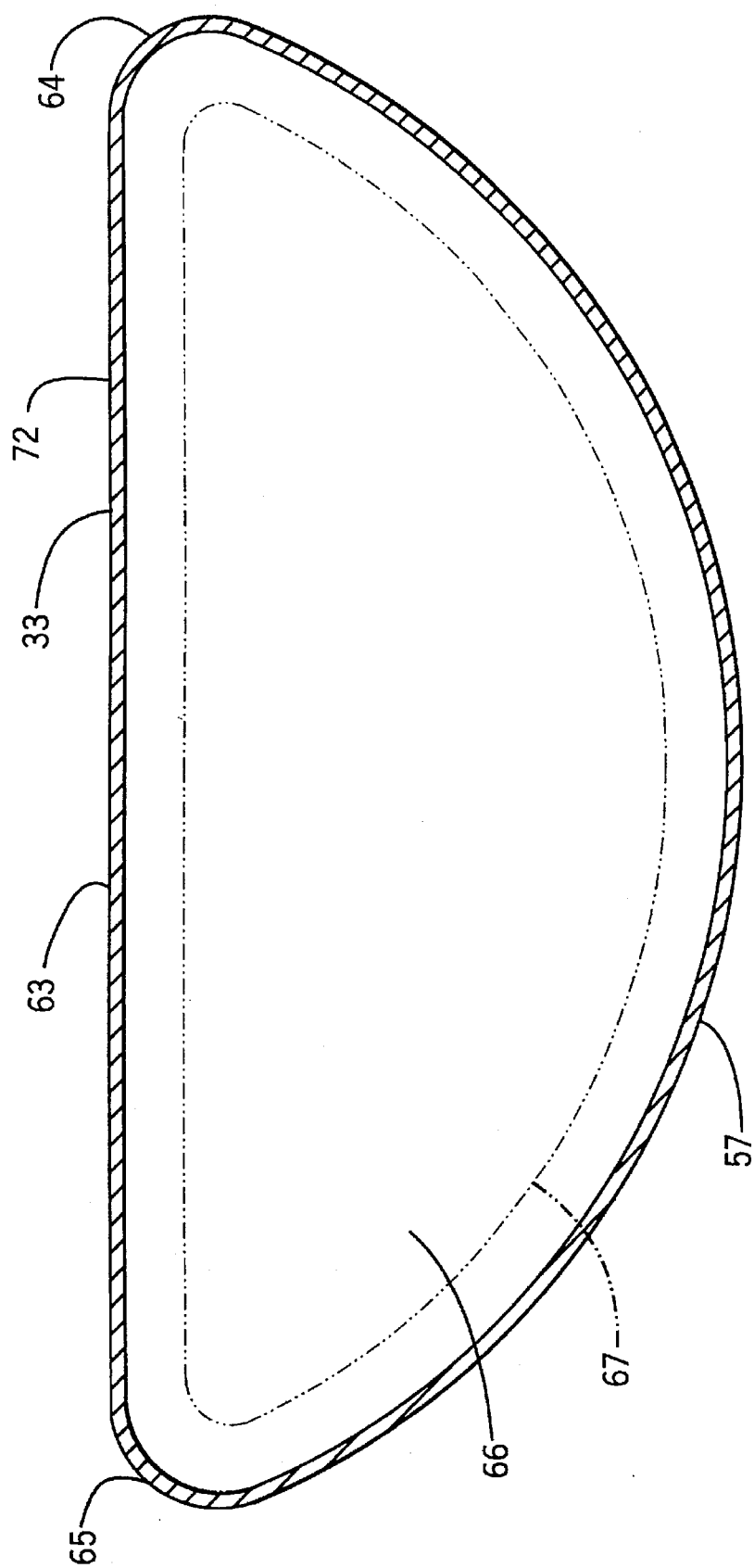
FIG. 6 is a section plan view of the aquarium as taken through FIG. 2.

Referring to FIG. 6 there is shown a section plan view of the aquarium tank 72 as taken through FIG. 2. The aquarium tank 72 is the first layer of the aquarium 33.

The backside of the aquarium 63 is shown to be essentially flat in order to set the aquarium directly against a wall; this is possible since the filters or filtering system is not in the back of the aquarium like most other aquariums. The first side of the aquarium is shown as a rounded side and is shown as integral with or a continuation of the backside of the aquarium 63 and the front side of the aquarium 57 which is also rounder or curved for better visibility of any objects within the aquarium 33. The front side of the aquarium 57 integral with or is a further continuation of the second side of the aquarium 65 which is also integral with or a further continuation of the backside of the aquarium 63. The bottom of the aquarium 66 is also shown as being integral with or as a continuous part of the front side of the aquarium 57, the first side of the aquarium 64, the second side of the aquarium 65 and the back side of the aquarium 63 are formed as a single until suitably integral with or connected to the bottom of the aquarium 66 by the bottom curve 71 as better seen in FIG. 2. The bottom curve 71 is shown ending on the bottom tangent 67.

The configuration of the aquarium 33 saves space and is aesthetically pleasing because of the above described shape of aquarium 33 and the internal containment of the filter system. In addition, the view of any items within the aquarium tank 72 is not distorted. The aquarium 33 is further invented to be set against a wall or other objects wherein there are no projections outside of the aquarium 33 as with all other aquariums; it should be noted that the filter is not located at the back side of the aquarium 33, where it can damage a wall and take up more room.

The shown configuration of the aquarium filter tray 41 showing two filter systems in parallel will reduce the speed of liquid 51 following through the filters by one half (when compared to a single filter or filters in series). This is beneficial because a partially clogged filter will pass water more slowly as it clogs. Therefore a slower moving liquid 51, effectively increases filter life.

Although the aquarium and filter system of the invention have been described in detail those skilled in the art will understand that many variations are possible. For example the aquarium 1 could be round or rectangular, the floats could also be in the second and fourth ponds, there could be more filters in series or parallel, there there could be more lamps and there could be heaters shown.

Although the invention has been described with reference to the preferred embodiment it will be understood by those skilled in the art that additions, modifications, substitutions, deletions and other changes not specifically described, may be made in the embodiments herein, it should be understood that the details herein are to be interpreted as illustrative and are not in a limiting sense.

What is described as invention is:

1. An aquarium filtering system for filtering debris suspended in liquid contained within an aquarium, the filtering system comprising:
   a. a fluid reservoir defined by
      (1) a first side containment bulkhead;
      (2) a second side containment bulkhead;
      (3) a upper containment bulkhead;
      (4) a filter reservoir bottom;
   b. a filter support frame;
   c. a filter supported by said filter support frame to form a substantially vertical filter wall, wherein said filter wall partitions said reservoir to form at least one filter pond such that liquid contained within said pond can flow through said filter wall;
   d. a pump for pumping liquid from said aquarium and discharging said liquid into said filter pond;
   e. a float having an upper end and a lower end, said float disposed within said filter pond for suspension by liquid contained within said filter pond; and
   f. a filter condition indicator having a first end and a second end, wherein said first end is attached to said upper end of said float;

wherein the surface level of the liquid contained within the pond rises as debris is trapped by said filter wall as liquid passes therethrough, the rising surface level causing the float to likewise rise such that the filter condition indicator indicates the condition of the filter.

2. The aquarium filter system of claim 1 wherein said fluid reservoir is partitioned into at least two filter ponds.

3. The aquarium filter system of claim 1 further comprising aerator steps located within said fluid reservoir and adjacent said lower containment bulkhead.

4. The aquarium filter system of claim 1 further comprising a cover with at least one indicator guide, said cover disposed above said fluid reservoir such that said filter condition indictor is slidingly disposed within said indicator guide.

5. The aquarium filter system of claim 1 further comprising an aquarium filter tray, wherein said filter pond, said filter support frame, said filter, said pump and said float are all supported on said aquarium filter tray.

6. An aquarium filtration, heating and lighting system in combination with an aquarium having liquid contained therein, said system comprising:

an aquarium filter tray mounted over said aquarium;
   a liquid containment reservoir having a side wall and a bottom wherein said reservoir is disposed on said aquarium filter tray; and
   lamp means for heating liquid in the reservoir and lighting liquid within the aquarium, said lamp means located below said reservoir and above the surface of said liquid in the aquarium, wherein the heat produced by said lamp means is captured by said bottom of said reservoir and wherein heat captured by said bottom of said reservoir is further transferred to said liquid contained in said reservoir thus heating said liquid contained therein and wherein said lamp means further illuminates said liquid contained in said aquarium.

7. The aquarium system of claim 6 further comprising a vane formed on the bottom of said reservoir to collect heat.

8. The aquarium system of claim 6 further comprising aerator steps within said reservoir wherein said aerator steps allow said liquid to be aerated and assist in transferring heat from said lamp to said liquid.

* * * * *